Oct. 27, 1925.	1,558,732

H. W. YOUNG

TIMER

Filed Aug. 14, 1923

Witness
R. E. Weber

Inventor:
Harry W. Young
By
Attorneys

Patented Oct. 27, 1925.

1,558,732

UNITED STATES PATENT OFFICE.

HARRY W. YOUNG, OF MILWAUKEE, WISCONSIN.

TIMER.

Application filed August 14, 1923. Serial No. 657,317.

*To all whom it may concern:*

Be it known that I, HARRY W. YOUNG, a citizen of the United States, and resident of Milwaukee, in the county of Milwaukee and State of Wisconsin, have invented certain new and useful Improvements in Timers; and I do hereby declare that the following is a full, clear, and exact description thereof.

This invention relates to timers and is particularly directed to a timer having an eccentrically mounted ball-bearing rotary contact. In manufacturing timers of this general type, difficulty has been experienced in assembling the balls between the inner and outer rings of the rotary contact.

It has been the practice to spin rings in place to hold the balls after assembling, to provide two-part rings, and to provide additional means for retaining the balls in position. All of these expedients are unnecessarily laborious attempts at the solution of this problem and materially add to the final cost of the article, as they involve additional, separate, and independent operations.

This invention is designed to overcome these defects and the primary object of this invention is to provide a timer having an eccentrically mounted ball-bearing contact, in which the balls are held in their assembled position without additional means other than the main elements of the device.

Further objects are to provide a timer in which the mere assembling will in itself retain the balls in their assembled position; to provide a timer in which a novel and simple form of resilient member and associated parts are provided; and to provide a construction in which crystallization of the spring is prevented.

An embodiment of the invention is shown in the accompanying drawings in which—

Figure 1:
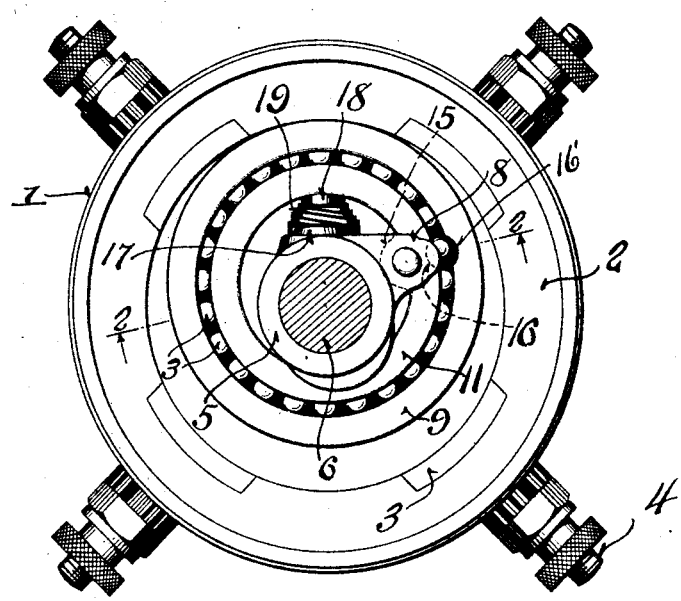
Figure 1 is a face view of the timer showing the parts in assembled position.

Within the usual casing 1 of the timer an insulating ring 2 is mounted and is provided with a plurality of contact members 3 and held in position and adapted for electrical connection to other portions of the system by means of the bolts and associated members as indicated at 4.

A hub 5 is adapted for attachment to the timer shaft 6 and is provided with outwardly extending apertured ears 7 and 8—the ear 8 being extended outwardly to a slightly greater extent than the ear 7, for a purpose hereinafter to appear.

The outer ring 9 of the rotary contact is a single unitary member, provided with a ball race-way 10. The inner ring 11 is also a single unitary member, provided with a ball race-way 12. Between these two members the balls 13 are positioned, as shown in the drawings, and the member 11 is secured to the hub 5 by means of the rivet or similar member 14, which is passed through the apertured ears 7 and 8 through an aperture in the inner ring 11. If desired, the inner ring 11 may be provided with an inwardly projecting boss or enlargement 15 to reinforce such ring adjacent the rivet-receiving aperture.

In order to provide for ready assembling of the balls 13, a notch 16 is formed through one side of the inner ring 11 and a corresponding notch 16' is formed in the outer race in position to open into the race-ways 12 and 10.

Figure 2:
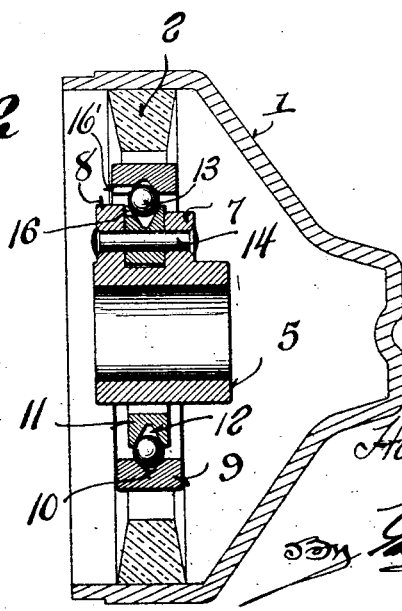
Figure 2 is a sectional view of the plane 2—2 of Figure 1.

The balls are passed through the notch 16 and when the requisite number have been assembled, the hub is slipped into position with the ears 7 and 8 upon opposite sides of the ring 11 and with one of the ears, for instance ear 8, overlapping the aperture 16, thus closing such aperture. The rivet 14 is then positioned and securely retains the parts in their relative position; and it is to be noted that the relatively elongated ear 8 is preferably positioned over the aperture 16 as shown in Figure 2.

It is to be particularly noted that no additional parts are needed for closing the notch or aperture 16, and that the main elements of the timer are employed for this purpose, and that the retention of the balls in their assembled position is secured by merely pivoting the hub to the inner ring without necessitating an extra operation or an extra set of elements for this purpose.

It has been found in timers of this general type that rapid crystallization of the springs frequently occurs, due to the excessive relative motion of the individual parts of the spring. Also there is frequently a shifting or slipping of the spring from its correct position. Both of these defects are readily avoided in this construction by providing a relatively large boss 17 as an integral portion of the hub 5, and by providing a relatively smaller similar boss 18 at an integral part of the ring 11. Between these bosses a conically shaped helical spring 19 is positioned with the successive convolutions thereof spaced apart a distance sufficient to permit one convolution to clear the adjacent convolution when the spring is compressed. It has been found that a very serviceable spring may be formed, as shown in Figure 1 of the drawings, by employing relative rectangular spring material and coiling this spring as shown in said figure. Thus it is not necessary in this type of spring to allow space between successive convolutions as measured axially of the spring in order to provide for the necessary motion. It will thus be seen that more convolutions may be employed than heretofore and that therefore relative motion of the individual portions of the spring may be reduced to a minimum and thus crystallization materially reduced.

It will thus be seen that a timer has been provided in which the main parts of the timer are employed for retaining the balls in their assembled position without requiring additional operations or additional members.

It will also be seen that an extremely simple and serviceable type of timer has been provided, in which rapid crystallization of the spring is prevented and in which an extremely small number of parts are employed.

Although one form of the invention has been described in considerable detail, it is to be understood that the invention may be variously embodied and is, therefore, to be limited only as claimed.

I claim:—

1. A timer comprising a casing, an insulated ring mounted therein, plurality contact carried by said ring, a shaft projecting into said casing, a hub mounted upon said shaft and having an outwardly extending portion, an inner ring having a ball race-way therein and having a notch leading into said race-way and pivotally joined to such outwardly projecting portion of the hub with said portions closing said notch, an outer ring surrounding said inner ring and provided with a ball race-way, and a plurality of balls carried within said race-ways and means for urging said inner and outer rings outwardly relatively to said hub.

2. A timer comprising a casing provided with a stationary insulating ring having plurality of contacts carried thereby, a shaft projecting into said casing, a hub secured to said shaft and having a pair of spaced integral ears projecting therefrom; an inner ring provided with a race-way and a notch leading thereinto, means pivotally joining said ears and said inner ring with one of said ears over-lapping said notch, an outer ring surrounding said inner ring and provided with a race-way, a plurality of balls positioned between said race-ways and a spring for tending to cause relative motion between said rings and said hub.

3. A timer comprising a casing provided with a stationary insulating ring having a plurality of contacts carried thereby, a shaft projecting into said casing, a hub secured to said shaft having a pair of spaced integral ears projecting therefrom, an inner ring provided with a raceway and having an apertured inwardly projecting enlarged portion, said inner ring having a lateral notch adjacent said enlarged portion and leading into said raceway, a pintle pin directly joining the enlarged portion of said inner ring with the projecting ears of said hub with one of said ears closing said notch, an outer ring surrounding said inner ring and provided with a raceway, a plurality of balls positioned between said raceways, and a spring urging a portion of said inner ring outwardly from said hub.

4. A timer comprising a casing provided with an insulating ring having a plurality of contacts mounted thereon, a rotary member positioned interiorly of said ring and comprising a hub and inner ring pivotally mounted upon said hub, an outer ring surrounding said inner ring, a plurality of balls positioned between said inner and outer rings, and a helical conically shaped spring mounted between said inner ring and said hub with each successive convolution of said spring spaced radially outwardly beyond the preceding convolution.

In testimony that I claim the foregoing I have hereunto set my hand at Milwaukee, in the county of Milwaukee, and State of Wisconsin.

HARRY W. YOUNG.